United States Patent

[11] 3,570,361

[72] Inventor George A. Tinnerman
  17864 Beach Road, Lakewood, Ohio 44104
[21] Appl. No. 816,956
[22] Filed Apr. 17, 1969
  Division of Ser. No. 569,478, Aug. 1, 1966,
  Pat. No. 3,456,705
[45] Patented Mar. 16, 1971

[54] GROOVE CUTTING FASTENER
  2 Claims, 7 Drawing Figs.
[52] U.S. Cl. .................................................. 85/32
[51] Int. Cl. ............................................. F16b 37/02
[50] Field of Search .......................................... 85/36, 32
  (Int.); 10/152

[56] References Cited
UNITED STATES PATENTS

| | | | |
|---|---|---|---|
| 2,969,705 | 1/1961 | Becker | 85/36 |
| 2,986,059 | 5/1961 | Duffy et al. | 85/32 Int. |
| 2,561,036 | 7/1951 | Sodders | 85/36 |
| 3,345,899 | 10/1967 | Fiddler | 85/32 Int. |

Primary Examiner—Edward C. Allen
Attorneys—Revere B. Gurley and Arthur H. VanHorn ABSTRACT: A sheet metal nut element for cutting a groove or thread channel on a smooth shank is formed with a plurality of teeth on the peripheral edge of an aperture which receives a shank. The periphery of the aperture is interrupted by breaks or discontinuities and each tooth is formed by an angle at the intersection of the peripheral edge and the edge of a discontinuity. The edge between the discontinuities is deflected axially to lie in a spiral curve and extend radially inwardly of the spiral curve and form teeth that cut a groove in the shank.

Patented March 16, 1971  3,570,361

INVENTOR.
GEORGE A. TINNERMAN
BY

GROOVE CUTTING FASTENER

This application is a division of Ser. No. 569,478, filed Aug. 1, 1966, for Groove Cutting Rotating Fastener. now Pat. No. 3,456,705, issued Jul. 22, 1966.

My invention relates to a fastener in which one of two relatively rotatable members extends through an aperture in the other, and the two members are secured together by teeth on the apertured member which cut threads in the surface of the other member. The apertured member may be a nut or equivalent and the member projecting through the aperture is usually in the form of a stud or shank.

Some types of fasteners are already known in which the nut or similar element forms its own thread on an unthreaded rod or stud, but these have disadvantages because of size, either radially or axially of the stud. It is also difficult in many of these fasteners to align the nut properly on the stud due to "rocking" of the nut about its points of engagement, so that extreme care is required of the operator to maintain alignment.

It is therefore one of the objects of this invention to construct a fastener which preferably is made of suitable sheet material and which is provided with means for cutting a groove or thread channel in an unthreaded stud or the like during relative rotative movement between the fastener and the stud.

Another object is a fastener of the type disclosed herein which is provided with a plurality of substantially radially disposed multiple cutting means arranged at three or more points in an opposed fashion about a stud or shank-receiving opening in the fastener for thread channel-cutting engagement therewith.

A further object is a multitoothed thread-cutting fastener formed of a relatively stiff sheet material which is self-aligning with respect to the axis of the stud or shank on which it is applied.

Another object of the invention is a structure which is adapted to the economical use of prehardened and prefinished materials, thereby eliminating costly hardening and tempering operations.

Still another object is a relatively thin-walled fastener of stiff sheet material having a stud-receiving opening therein and provided with at least three stud-engaging thread-cutting means arranged along a helical path about the opening.

Still another object is to provide a multitoothed thread-cutting fastener by which a continuous single groove or thread channel may be formed along the stud permitting the associated parts to be drawn tightly together in clamped assembled position.

Another object of my invention is the formation of a fastener with axially spaced thread channel-cutting elements, each terminating in a point to form a cutting tooth, the points if projected on a plane defining a circle, its center lying in the axis of rotation of the fastener when rotated on a shank.

Other and further objects and advantages of this invention will become more apparent from the following description and claims, reference being made to the accompanying drawing which shows several embodiments of the present invention and the principles thereof, and in which drawing like reference characters are employed to designate like parts throughout the same.

Figure 3:
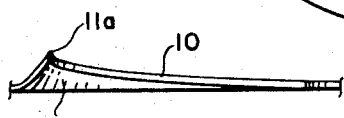
FIG. 3 is a view looking in the direction of the arrows 3—3 of FIG. 2 and illustrates one of the locating and positioning edges and its associated groove or thread channel cutting tooth.
Figure 4:
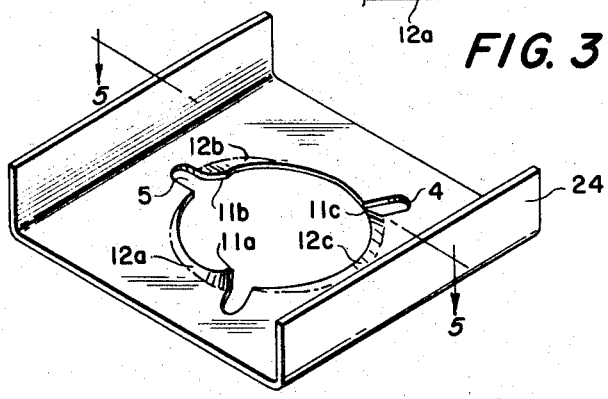
FIG. 4 illustrates still another modified form of fastener embodying my invention.
Figure 5:
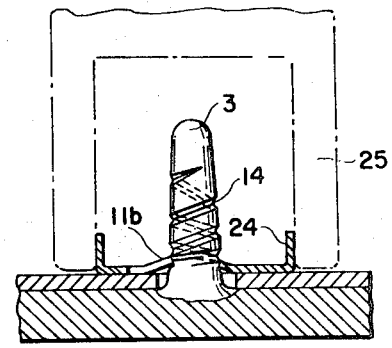
FIG. 5 is a view partly in section as taken on line 5—5 of FIG. 4, showing the fastener driven home on the stud by means of a wrench or other tool as a result of forming its own thread channel in the stud during such operation.

A fastener which illustrates specifically my invention as applied to a nutlike element which may be secured to a shank or stud is shown in FIGS. 1 to 5, in which the thread channel or groove forming structure are the same. The fastener 1 in FIG. 1 has an aperture 2 to receive a stud 3 as shown in FIG. 5. The periphery of this aperture 2 is interrupted or is discontinuous at three spaced points 4, the slots or notches 5 extending outwardly from the periphery bordered by the side edges 6, 7.

Figure 1:
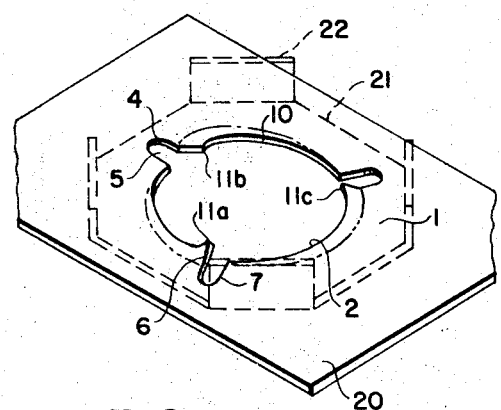
FIG. 1 is a perspective view of a fastener embodying one form of my invention.
Figure 2:
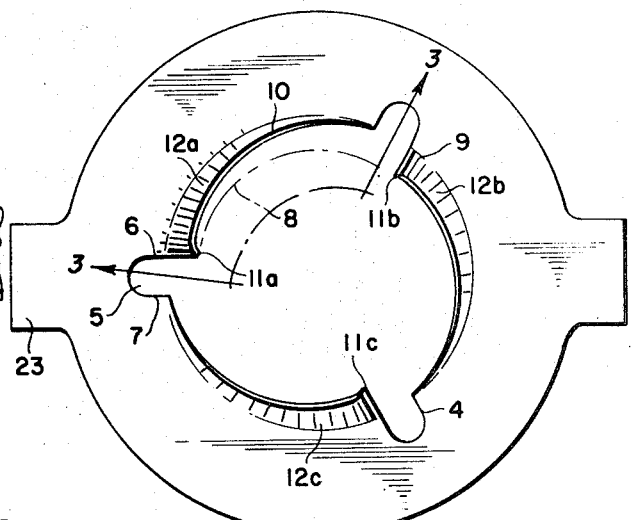
FIG. 2 is a modified form.

As shown in FIG. 2, the side edges 7 are shorter than the side edges 6, so that the inner ends of side edges 6 are closer to the axis of the aperture and lie substantially in a circle 8 of smaller radius than the inner ends of edges 7, which lie on the circle 9. The edge 10 of the aperture 2 connecting the inner end of one side edge 7 with the inner end of the side edge 6 of the adjacent notch 4 decreases in distance from the center, as will be seen in FIG. 2, this spiral edge terminating in a tooth 11a. This tooth is formed by the extension of the spiral edge curving inwardly of a continuation of the spiral curve of said spiral edge and intersecting the side edge 6 at an acute angle to form the inwardly directed tooth as shown at 11a in FIGS. 1 and 2. As is best shown in FIG. 3, this edge 10 of the aperture is deflected out of the plane of the circle 9, as at 12a, to lie in a spiral path, the tooth 11a extending inwardly of the periphery, the edge 10 sloping from the plane of the circle 9 to the inwardly directed tooth 11a.

Shown in these FIGS. are three notches or discontinuities 4 in the periphery of opening 2, and three arcuate edges 10 between these discontinuities. The three teeth 11a, 11b, 11c are not in the same plane, but are at the end of unequally deflected portions 12a, 12b, 12c. The teeth lie in a spiral curve, and each tooth is spaced axially from its adjacent tooth by one-third of the pitch distance of the helical groove to be formed in the stud when the element 1 is rotated on a stud. The sides of the inwardly directed teeth adjacent the edges 12a, 12b, 12c form the cutting edges of the teeth and the edges 12a, *12b*, 12c engage the stud 13 at an acute angle and with the three cutting teeth 11a, 11b, 11c maintain the nut element on the stud in axial alignment. The three teeth engage the stud 3 with equal pressure, since the fastener 1 is free to move laterally until the forces acting on the three teeth are equal. Under equal pressure, the teeth will cut the shank equally. The edges may be so inclined that the groove being cut by one tooth is engaged by the edge of the following tooth, so that the next tooth cuts deeper in the same groove, and the edges guide the teeth in cutting a single helical groove or thread channel 14, as shown in FIG. 5.

Each tooth contributes to cutting the groove, and this groove or thread channel 14 will be deeper by the removal of on the order of three times as much material as one tooth would remove. As a result, the fastener 1 engages the stud 13 in a groove 14 substantially deeper than if the teeth formed separate grooves.

This fastener may be made from hardened steel, and the hardened cutting teeth are thus provided without necessity for subsequent hardening operation.

The forms of fastener shown in FIGS. 1 to 5 differ by the formations for manufacture and wrench engagement. In FIG. 1, the strip 20 may be punched and formed by successive actions. The strip may then be cut and bent as shown by dotted lines 21 to provide wrench seats 22.

The element in FIG. 2 is provided with tool engaging arms 23, while in FIGS. 4 and 5, flanges 24 provide for engagement of wrench 25. The stud 3 may be tapered as shown, and the single groove 14 is cut by the joint, successive action of the three cutting teeth.

The fastener or nut element having cutting teeth to cut a deep, single groove in a stud or shank may be incorporated in a rigid or semirigid plastic body to form a composite fastener.

Figure 6:
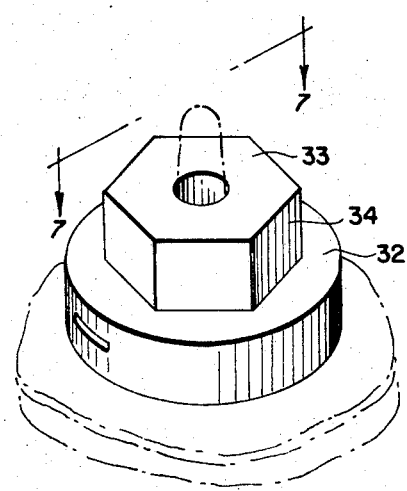
FIG. 6 is a perspective view of a further modification of the invention wherein the fastener is enclosed within a molded body of suitable plastic material, the body being formed with tool engaging faces.
Figure 7:
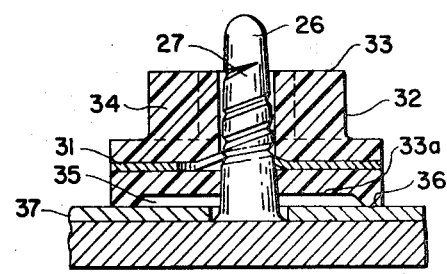
FIG. 7 is a vertical section taken on line 7—7 of FIG. 6.

In FIGS. 6 and 7, the metal fastener element 31 has cutting teeth which are the same as those in FIGS. 1 to 5 and engage a stud 26 to cut a groove 27 in the stud. This metal fastener element is incorporated in a body 32 of plastic material of rigid or semirigid type, which may be considered essentially rigid. This plastic body is similar to the nut body of the composite nut disclosed and claimed in the Tinnerman application, Ser. No. 549,880, filed May 13, 1966 now U.S. Pat. No. 3,468,212. In the form illustrated here, the metal fastener element 31 extends to the periphery on opposite sides of the plastic body, and is spaced from the opposite end faces 33, 33a of the body. The plastic body 32 has a polygonal 34 portion to operate as a wrench seat for rotating the composite fastener on the stud, and the lower or engaging face 32 of the plastic body is hollowed at 35, so that only a peripheral portion 36 engages initially the surface of a member 37 engaged by the fastener. As the fastener is tightened, the cutting teeth of the metal fastener element 31 will engage the groove 27 cut in the stud 3 to exert pressure on the plastic body, compacting the body against the stud and the member engaged, and distorting the hollow base, providing a resilient and liquid-tight engagement. At the same time, the essentially rigid plastic body 32 will reduce distortion of the metal element 31, with resilient resistance to deflection of the metal components.

The specific examples of my invention described herein are intended to illustrate the invention which contemplates various modifications within the spirit and scope of the appended claims.

I claim:

1. A sheet metal, apertured, groove-cutting fastener element having groove-cutting teeth in the aperture which cut a spiral groove formation in a shank upon relative rotation on a shank in said aperture, the periphery of said aperture comprising at least three segments between discontinuities in said periphery, each discontinuity having a side edge extending outwardly from the periphery, each segment having an edge laying in a spiral curve extending from one discontinuity to a tooth at the side edge of the following discontinuity, each said tooth being formed by the intersection at an acute angle of an edge extending inwardly of a continuation of the spiral curve of a spiral edge of a segment with said side edge of a discontinuity to form a sharply pointed tooth directed inwardly of said periphery, said spiral edges being axially deflected out of the plane of the body of said fastener element, so that the fastener element will thread upon a shank as each tooth cuts a spiral groove formation in said shank.

2. A sheet metal, apertured, groove-cutting fastener element for threading on to a smooth surface shank by cutting a spiral groove formation in said shank upon relative rotation, comprising a sheet metal fastener element having an aperture therethrough, the periphery of said aperture being interrupted by at least three discontinuities, each discontinuity being formed with an edge extending outwardly from said periphery, said periphery being axially deflected out of the plane of said sheet metal between each two discontinuities to form a spiral edge extending from one discontinuity to a tooth at the outwardly extending edge of the following discontinuity, each said tooth being formed by the intersection at an acute angle of an edge extending inwardly of a continuation of the spiral curve of said spiral edge with said outwardly extending edge of said discontinuity to form a sharp groove-cutting tooth extending inwardly of said periphery with its leading edge engaging the surface of said shank at an acute angle at the point of contact when rotated on said stud and its trailing edge the outwardly directed edge of said discontinuity, successive cutting teeth being spaced axially on a spiral curve an axial distance of one-third of the pitch distance of a single spiral groove cut in said shank.